United States Patent
Arunkumar et al.

(10) Patent No.: US 9,854,398 B1
(45) Date of Patent: Dec. 26, 2017

(54) SYSTEM, METHOD AND RECORDING MEDIUM FOR LOCATION VERIFICATION

(71) Applicant: International Business Machines Corporation, Armonk, NY (US)

(72) Inventors: Saritha Arunkumar, Basingstoke (GB); Nizar Lethif, Croton on Hudson, NY (US); Mudhakar Srivatsa, White Plains, NY (US); Enara C. Vijil, Croton on Hudson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/227,868

(22) Filed: Aug. 3, 2016

(51) Int. Cl.
| | |
|---|---|
| *H04W 4/02* | (2009.01) |
| *H04W 4/00* | (2009.01) |
| *H04B 17/318* | (2015.01) |
| *H04W 88/02* | (2009.01) |
| *H04W 88/08* | (2009.01) |
| *H04W 84/12* | (2009.01) |

(52) U.S. Cl.
CPC .......... *H04W 4/023* (2013.01); *H04B 17/318* (2015.01); *H04W 4/008* (2013.01); *H04W 84/12* (2013.01); *H04W 88/02* (2013.01); *H04W 88/08* (2013.01)

(58) Field of Classification Search
CPC ..... H04W 4/023; H04W 4/008; H04W 84/12; H04W 88/02; H04W 88/08; H04B 17/318
See application file for complete search history.

(56) References Cited

U.S. PATENT DOCUMENTS

| | | | |
|---|---|---|---|
| 7,764,224 B1 * | 7/2010 | Anderson | G01S 19/215 342/357.27 |
| 8,428,010 B2 | 4/2013 | Huang et al. | |
| 8,552,903 B2 * | 10/2013 | Julian | G01S 13/765 342/118 |
| 9,042,907 B2 | 5/2015 | Oka et al. | |
| 9,305,298 B2 | 4/2016 | Wilson | |
| 2005/0052319 A1 * | 3/2005 | Hatch | G01S 19/20 342/357.58 |
| 2007/0247367 A1 * | 10/2007 | Anjum | H04W 64/00 342/464 |

(Continued)

OTHER PUBLICATIONS

Mel, et al. "The NIST Definition of Cloud Computing". Recommendations of the National Institute of Standards and Technology. Nov. 16, 2015.

(Continued)

*Primary Examiner* — Nathan Mitchell
(74) *Attorney, Agent, or Firm* — Keven Jordan, Esq.; McGinn IP Law Group, PLLC

(57) ABSTRACT

A computer-implemented information verification method, system, and non-transitory computer readable medium, include measuring a first signal strength from a user device to a second device, where the first signal strength is measured from the perspective of the user device, measuring a second signal strength from the second device to the user device, where the second signal strength is measured from the perspective of the second device, comparing the first signal strength with the second signal strength, and verifying the information, based on a result of said comparing.

20 Claims, 5 Drawing Sheets

(56) References Cited

U.S. PATENT DOCUMENTS

| | | | |
|---|---|---|---|
| 2009/0005061 A1* | 1/2009 | Ward | G01S 5/021 455/456.1 |
| 2010/0127920 A1* | 5/2010 | Harper | G01S 19/215 342/357.58 |
| 2011/0287779 A1* | 11/2011 | Harper | G01S 19/03 455/456.1 |
| 2012/0192252 A1 | 7/2012 | Kuo et al. | |
| 2013/0275513 A1* | 10/2013 | Borovyk | H04W 8/18 709/204 |
| 2013/0337827 A1* | 12/2013 | Grobman | G01S 19/08 455/456.1 |
| 2014/0179340 A1* | 6/2014 | Do | G01S 13/765 455/456.1 |
| 2014/0274122 A1* | 9/2014 | Tseng | G01S 19/14 455/456.1 |
| 2015/0055491 A1* | 2/2015 | Kadous | H04W 4/023 370/252 |
| 2015/0141027 A1* | 5/2015 | Tsui | H04W 52/243 455/452.1 |
| 2015/0215762 A1* | 7/2015 | Edge | H04W 8/005 370/338 |
| 2015/0282115 A1* | 10/2015 | Pitt | H04W 64/006 455/456.1 |
| 2015/0350833 A1* | 12/2015 | Kazemi | H04W 4/028 455/456.6 |
| 2016/0128017 A1 | 5/2016 | Qiu et al. | |

OTHER PUBLICATIONS

Camenisch, et al. "Strengthening Authentication with Privacy-Preserving Location Verification of Mobile Phones". WPES 2015, Proceedings of the 14$^{th}$ ACM Workshop on Privacy in the Electronic Society. pp. 37-48.

* cited by examiner

SYSTEM, METHOD AND RECORDING MEDIUM FOR LOCATION VERIFICATION

BACKGROUND

The present invention relates generally to a location verification method, and more particularly, but not by way of limitation, to a system, method, and recording medium for verifying a location of a device based on comparing a signal strength received by the device with a signal strength received by an access point (AP) in a vicinity of the device.

Handheld (portable) devices send a location of a device based on a Global Positioning System (GPS). However, these coordinates can be faked or misrepresented by an owner (or another user) of the device if required to gain access to an access point that requires a location verification.

Conventionally, access to specific resources can be given based on an identification and a location of the user. The user is typically given a device that can send a location (e.g., based on GPS coordinates). This, along with the credentials of the user is used to verify that a user is at a particular location. Thus, a two-tier security measure is in place. However, unless the device is tamper-resistant, the owner can fake the location of the device. Global attestation procedure is a way of making the job of a malicious user difficult by validating credentials from surrounding devices called "Brokers". For example, access to a server can be guaranteed only if the user's device is connected to the office network through Wi-Fi. In this case, the access point reports that the user is physically connected to the office network and hence is likely inside the office (or at least nearly).

Thus, the needs in the art include a location verification technique that is not susceptible to location spoofing due to the one-way verification required from the device-to-server verification.

SUMMARY

In an exemplary embodiment, the present invention can provide a computer-implemented information verification method, including: measuring a first signal strength from a user device to a second device, measured from the perspective of the user device, measuring a second signal strength from the second device to the user device, from the perspective of the second device; comparing the first signal strength with the second signal strength; and verifying the information, based on the comparison results.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Exemplary aspects of the invention will be better understood from the following detailed description, with reference to the drawings, in which.

DETAILED DESCRIPTION

Figure 1:
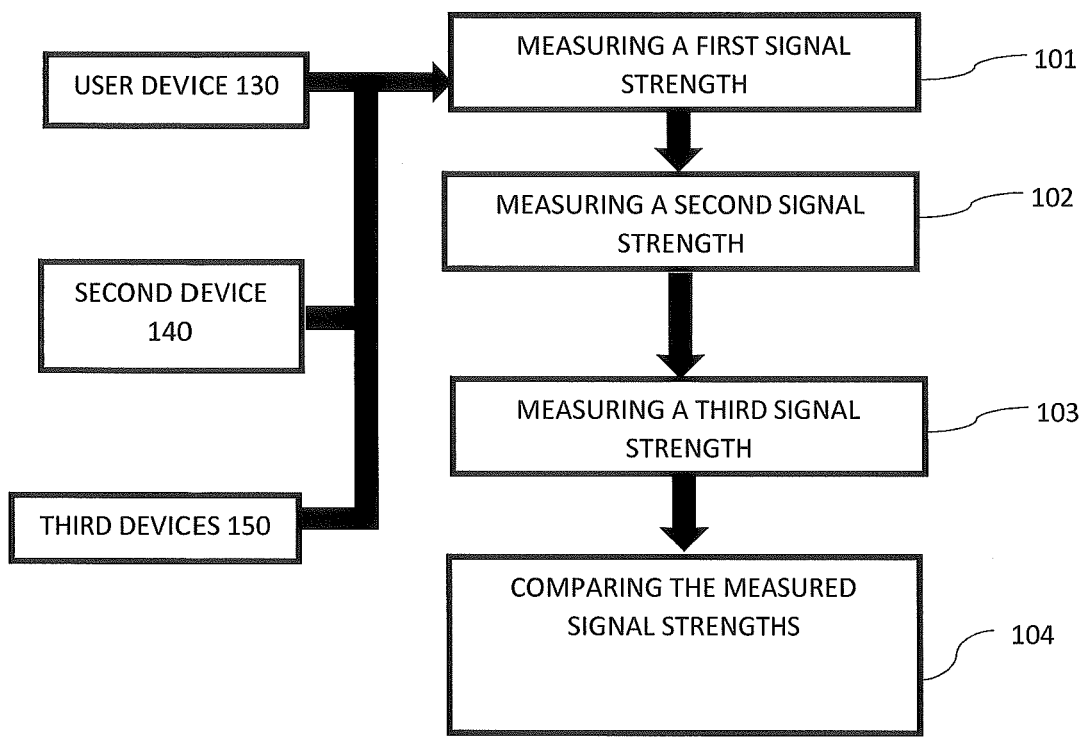
FIG. 1 depicts a high-level flow chart for a location verification method according to an embodiment of the present invention.

The invention will now be described with reference to FIG. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary embodiments are provided below for illustration purposes and do not limit the claims. By way of further example, although one or more embodiments (see e.g., FIGS. 3-5) may be implemented in a cloud environment 50 (see e.g., FIG. 4), it is nonetheless understood that the present invention can be implemented outside of the cloud environment.

With reference now to FIG. 1, a location verification method 100 according to an embodiment of the present invention includes various steps to measure and compare signal strengths from a user device 130 to a second device 140 and from the second device 140 to the user device 130 to verify the location of the device. As shown in at least FIG. 3, one or more computers of a computer system 12 according to an embodiment of the present invention can include a memory 28 having instructions stored in a storage system to perform the steps of FIG. 1.

Thus, a location verification method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Referring now to FIG. 1, in step 101 a first signal strength is measured between the user device 130 and a second device 140. The signal strength can be measured from the perspective of a client (user device 130) to one or more other devices, e.g., a server or other device(s), such as second device 140/third devices 150. For example, in step 101 user device 130 can request a radio signal connection to the second device 140 such that the strength of the radio signal connection from the user device 130 to the second device 140 can be measured. In addition, the location of user device 130 can also be determined. By way of further example, for devices enabled with conventional Bluetooth technology, the user device 130 may "pair" (e.g., via) with the second device 140. Thus, the location of user device 130 can be obtained and the strength of the "paired" connection between the user device 130 and the second device 140 measured. By way of still further example, for devices enabled with conventional Wi-Fi technology, user device 130 can request a WiFi connection to the second device 140

(such as a Wi-Fi router), and thus obtain and store the location of user device 130 and the strength of the connection between the devices measured. Such measurements are exemplarily depicted in FIG. 2 as percentage values in device data table 21.

For clarity, references to a "signal," "radio signal" and "connection" are exemplary only and should not be limited to any particular form of signal or connection. Rather, a signal or connection can be represented by any signal or connection, including but not limited to a Wi-Fi or Bluetooth connection, such that a strength of the signal (e.g., a connection between the user device 130 and second device 140) can be measured.

In step 102, a second signal strength is measured, e.g. a strength of the connection from the perspective of second device 140 to the user device 130.

In other words, in step 101, the first signal strength represents a measurement from the user device 130 to the second device 140—whereas in step 102, the second signal strength represents a measurement from the second device 140 to the user device 130.

In step 103, a third signal strength can be measured between the user device 130 and one or more nearby (other) third devices 150. In step 103, the signal strength is preferably measured from the perspective of the one or more (other) third devices 150 (e.g., a strength of the signal as perceived from the third device 150 to the user device 130). In some embodiments, all third devices 150 (other than the second device 140) which are in proximity (e.g., within a predetermined distance) of user device 130 request a radio signal of the user device 130 and the strength of each of the radio signal connections from the third devices 150 to the user device 130 is measured. Step 103 measures the third signal strength between devices at the location where the user device 130 is indicated (from Step 101). In other words, in step 103 all third devices 150 within a predetermined proximity to the location of user device 130 (e.g., as determined in Step 101) request a radio signal from user device 130 such that the third signal strength between each of the third devices 150 and user device 130 is measured (at the alleged location of user device 130). In some embodiments, each of the third signal strengths can either be independently stored for comparison or averaged together and the average stored for subsequent comparison (as described later).

In step 104, the first signal strength (measured in step 101) is compared with the second signal strength (measured in step 102) and a difference (if any) between the first signal strength and the second signal strength is quantified and if the difference is less than a predetermined threshold, the location of user device 130 can be considered as verified. In some embodiments, such comparison of signal strengths can be expanded to include one or more (or each of) third signal strength(s) measured from the perspective of the corresponding third device(s) 150 at the alleged location. In some embodiments, the location verification can include a comparison and determination of whether the first signal strength is also within a predetermined threshold of a third signal strength associated with a single third device 150 selected from among one or more multiple third device(s) 150 at the alleged location. In some embodiments, the location verification can require that the first signal strength also be within a predetermined threshold of multiple third signal strength(s) associated with corresponding multiple third device(s) 150 at the alleged location. In some embodiments, multiple third signal strengths are averaged and the comparison with the first signal strength is performed against such average to identify whether the result is within a predetermined threshold.

In some embodiments, the comparative signal strengths can be considered a further verification that device is actually at a location (not "spoofing" or "faking" its location) when the result is within a certain threshold. Such verification may also consider one or more device characteristics, noise levels, environment/terrain, etc. at the location. In other words, an extended two-way verification can be performed by comparing the respective signal strengths between one or more other devices 150 and user device 130.

Figure 2:
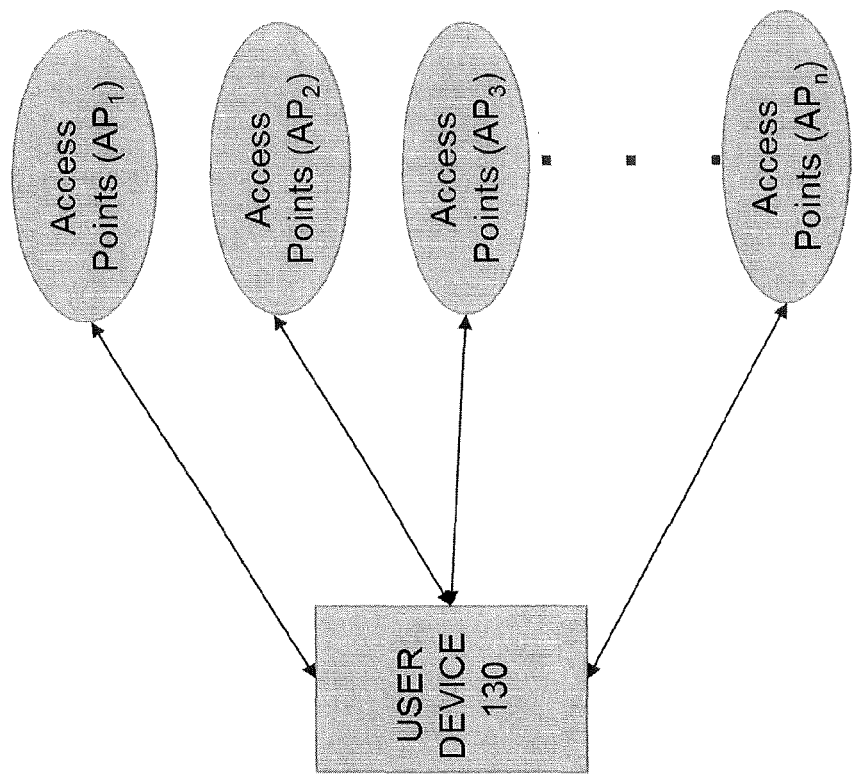
FIG. 2 depicts a device-to-AP signal strengths and AP-to-device signal strengths according to an embodiment of the present invention.

Referring now to FIG. 2, an embodiment of the present invention is depicted, where steps 101, 102, and 103 (FIG. 1) measure the respective first signal strength, second signal strength, and third signal strengths. The "measured by device data" table 21 (FIG. 2) shows an example of the results of Step 101. The user device 130 is attempting to connect to $AP_3$ (e.g., a second device 140). As shown, the first signal strength between user device 130 and $AP_3$ is 98.3%.

The "measured by Access Points data" table 22 shows an example of the results of Steps 102 and 103 as measured by and from respective access points AP1-$AP_3$. The depicted $AP_3$ result of 95.3% reflects the second signal strength measured by Step 102. As discussed previously with regard to the example of step 104 (FIG. 1) the signal strengths can be compared as part of the location verification process. The requirements of the verification process can be varied based on the device and/or security requirements of the access point (e.g., the desired level of security based on the underlying transaction). For example, a 3.0% difference threshold could suffice for some purposes, but might not for other purposes e.g., secure locations and transactions/authentications. In such embodiments, the security can be customized.

Referring again to the example depicted in FIG. 2, each of the access points $AP_1$, $AP_2$, and $AP_n$ represent examples of third devices 150 that are co-located with (or within a predetermined distance) of user device 130, e.g., "neighboring" devices. For example, if device 130 is attempting to connect with $AP_3$ as discussed above, and $AP_1$, $AP_2$, and $AP_n$ are identified as neighboring devices, in step 103, the signal strengths between one or more of the neighboring ($AP_1$, $AP_2$, and $AP_n$) devices and user device 130 can be included in the verification process. With reference again to the example described in step 104 (FIG. 1) the greater the number of third signal strengths that are measured, the greater the confidence will be that the purported location of the user device 130 is true (not faked or spoofed). In the example where $AP_3$ (FIG. 2) is identified as nearby to $AP_1$, $AP_2$, and $AP_n$, the respective measured signal strengths to device 130 should be similar to that measured by $AP_3$. By way of further example, such as is described in step 104 (FIG. 1), the first signal strength can be compared to each of the third signal strengths. Let us further assume that the third signal strength between $AP_2$ and device 130 is 10.2% and the first signal strength between device 130 and $AP_2$ is 18.2%. In this example, if the verification settings state that a signal strength difference of 8% or less meets a predetermined threshold value, the location can be stated as verified.

In one embodiment, a mobile device requests information from a location based service from the service provider. The service provider may need to verify the location of the device before providing the information to the device. The device making the request for information will be connecting to a particular access point (e.g., a second device) in the network. The access point can record the signal strength provided by the device (e.g., Step 101, FIG. 1). The access point (e.g., a second device) can request the location of the device and measure the signal strength of the device from its perspective (e.g., Step 102, FIG. 1). The access point (e.g., a second device) can verify by comparing the signal strength provided by the device with the signal strength measured by the access point (e.g., a second device) (e.g., Step 104, FIG. 1). A comparison that results in a match (within a predetermined threshold value), can thus provide better assurance that the requesting device is not misrepresenting its location.

It is noted that second device 140 and one or more (other) third devices 150 can comprise (without limitation) one or more access points, such as a Wi-Fi connection, a "hot spot", a Bluetooth connection, and a network router.

Thus, it can be seen that embodiments of the invention address one of many needs in the art. This need can be addressed by leveraging information available from associated Wi-Fi hotspots, Bluetooth signals, and other Near Field Communication (NFC) to better ensure that the requesting device is actually in the location that, before providing the information requested by the device.

It is further noted that "pairing" preferably refers to the type of well-known pairing of Bluetooth-capable devices. However, the "pairing" can also be more generally understood in the sense of two devices establishing a "connection" over one of many communication media (wired, wireless, optical . . . ) and/or protocols e.g., IP, Wi-Fi, SSMP.

In one embodiment, a service provider (e.g., Verizon™, IBM™, Comcast, DirectTV, etc.) can measure a connection from a cell phone (e.g., user device 130) to a Wi-Fi capable router (e.g., second device 140) as well as from the perspective of the Wi-Fi router (e.g., second device 140) to the cell phone (e.g., user device 130). The signal strengths can then be compared and e.g., if the result is within a predefined threshold, the purported cell phone location is better assured to be correct. Along the lines previously discussed, a service provider can further strengthen the verification if, for example, more security is appropriate, by measuring a signal strength from nearby third devices (e.g., a TV near the Wi-Fi router, a neighbors Wi-Fi router, etc.) to the cell phone and comparing the measured signal strength with the first signal strength.

Although the above embodiment is described in terms of a service provider measuring the signal strengths, the invention is not limited thereto. The method 100 can nonetheless be performed by any means that can measure and compare the signal strength in two directions.

Exemplary Aspects, Using a Cloud Computing Environment

Although this detailed description includes an exemplary embodiment in a cloud computing environment, it is to be understood that implementation of the teachings recited herein are not limited to such an environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises'.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
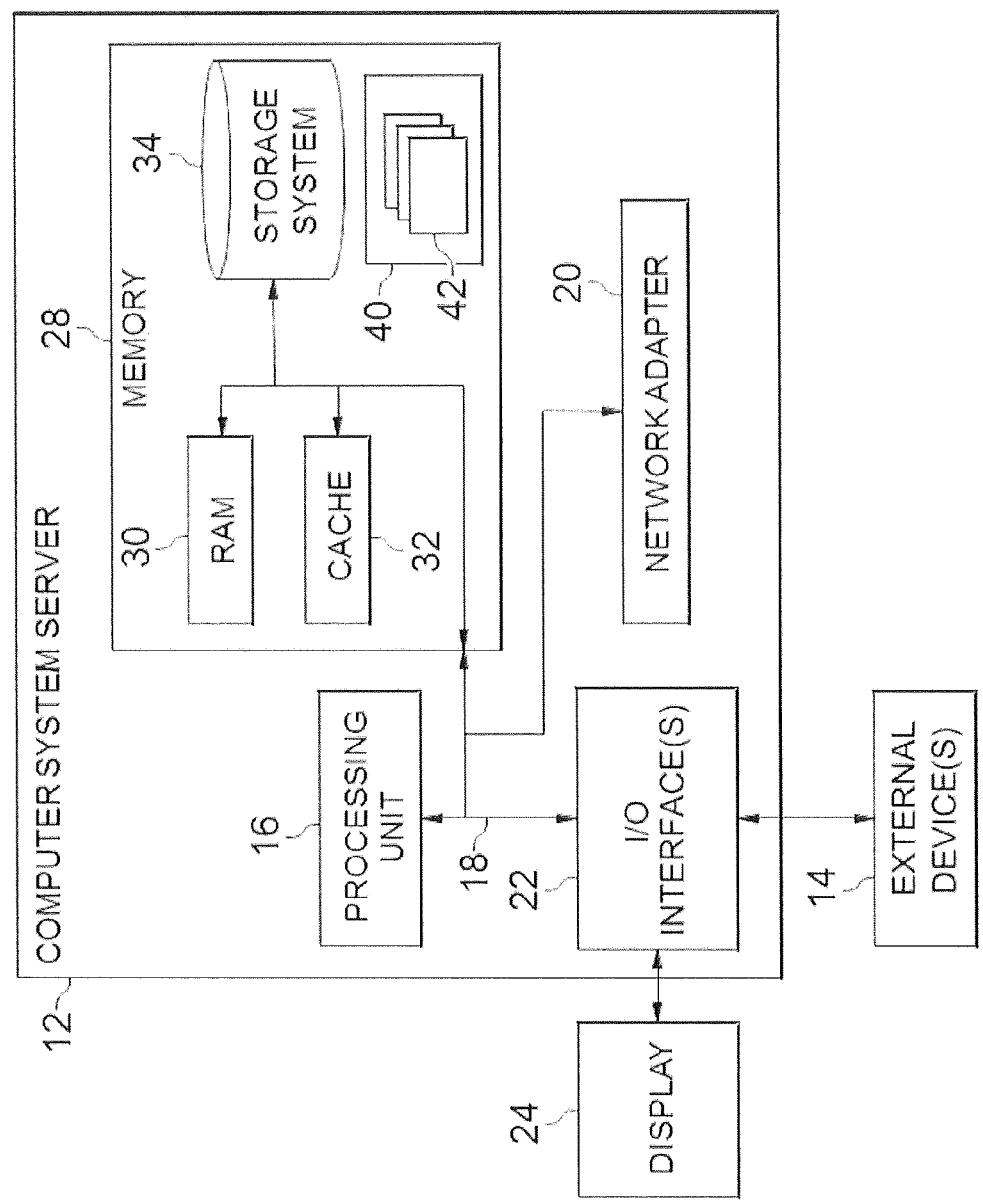
FIG. 3 depicts a cloud computing node according to an embodiment of the present invention.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 3, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
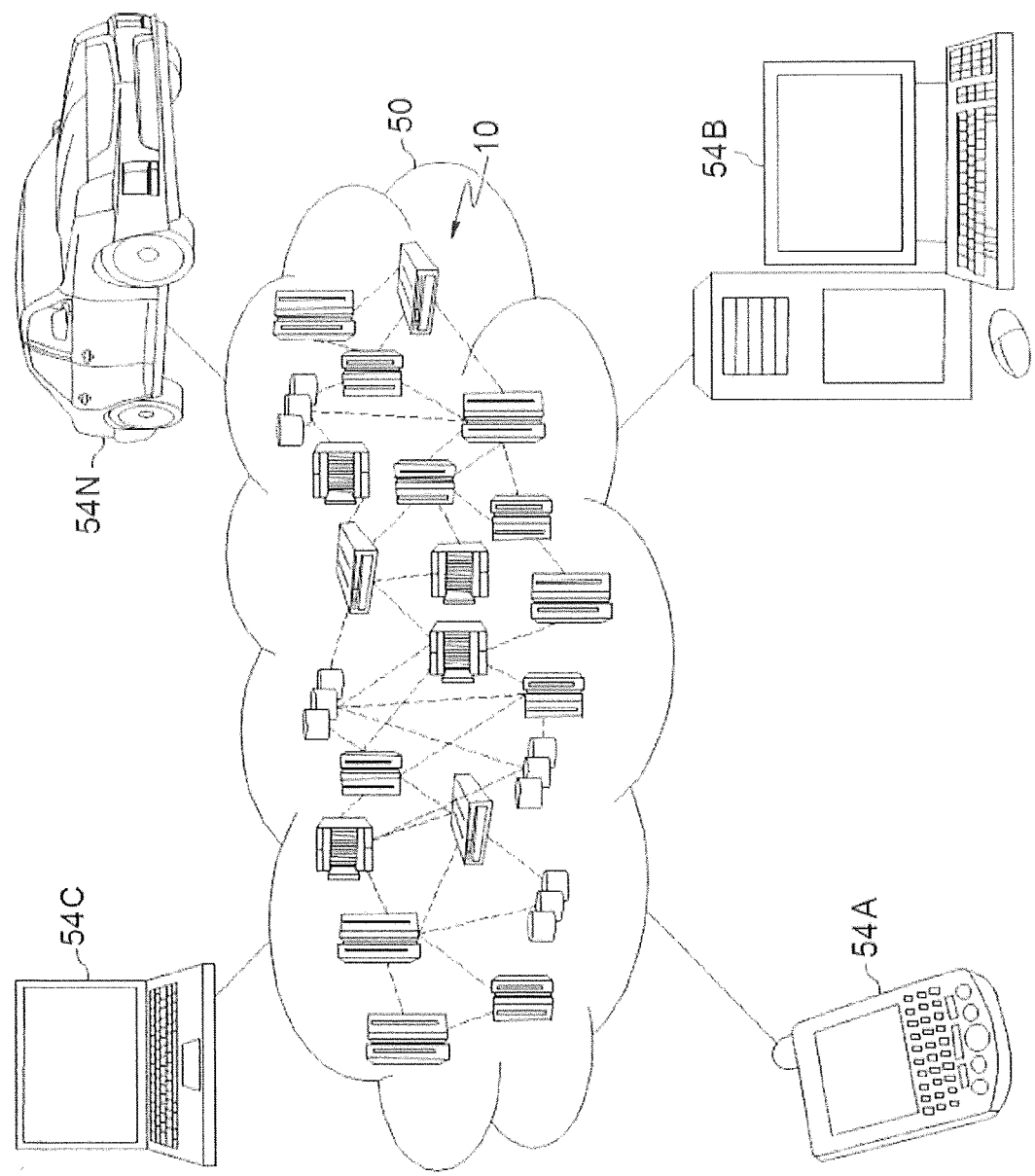
FIG. 4 depicts a cloud computing environment according to an embodiment of the present invention.

Referring now to FIG. 4, an exemplary cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
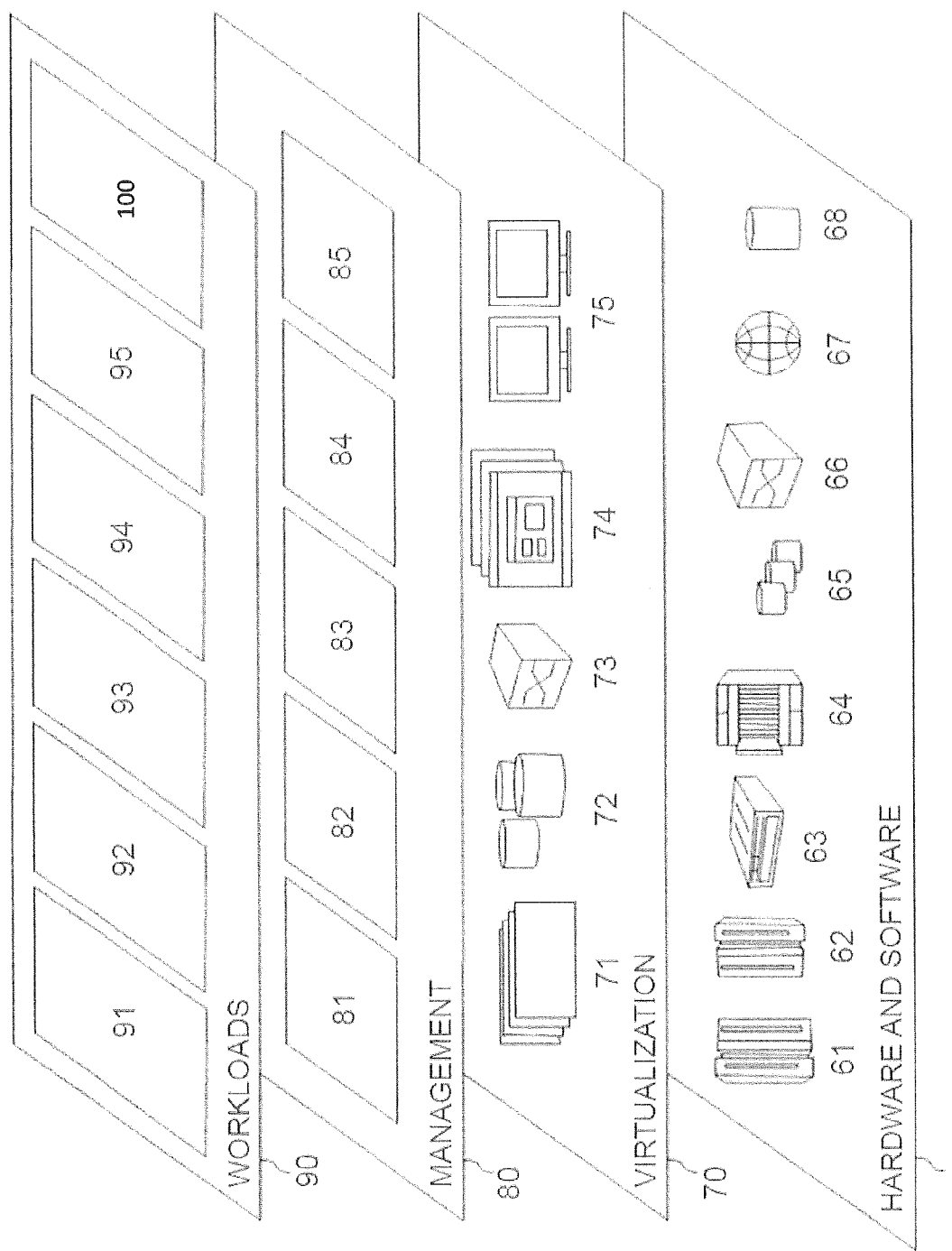
FIG. 5 depicts abstraction model layers according to an embodiment of the present invention.

Referring now to FIG. 5, an exemplary set of functional abstraction layers provided by cloud computing environment 50 (FIG. 4) is depicted. It should be understood that the components, layers, and functions shown in FIG. 5 are illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, location verification functionality 100.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented information verification method, the method comprising:
    measuring a first signal strength from a user device to a second device, where the first signal strength is measured from the perspective of the user device;
    measuring a second signal strength from the second device to the user device, where the second signal strength is measured from the perspective of the second device;
    measuring a third signal strength between a third device and the user device, where the third signal strength is measured from the perspective of the third device;
    comparing the first signal strength with the second signal strength and the first signal strength with the third signal strength; and
    verifying the information, based on a result of said comparing.

2. The method of claim 1, wherein the information is a location of the user device, and wherein the result of said comparing is based on a predetermined threshold value.

3. The method of claim 1, wherein the first device is selected from a group consisting of a mobile phone, a laptop, and a PDA.

4. The method of claim 1, wherein the second device is selected from a group consisting of an access point, a Wi-Fi hotspot, a network router, and a Bluetooth enabled device.

5. The method of claim 1, further comprising measuring a plurality of third signal strengths from a plurality of third devices to the user device,
    wherein the comparing compares the first signal strength with at least some of the third signal strengths to verify a location of the user device.

6. The method of claim 5, wherein the third devices are within a predetermined distance from the location of the user device.

7. The method of claim 5, wherein the location of the user device is verified based on a difference between the first signal strength and at least one of the third signals strengths being less than a predetermined threshold value.

8. The method of claim 5, wherein the location of the user device is verified based on a difference between the first signal strength and an average of all of the third signals strengths being less than a predetermined threshold value.

9. The method of claim 1, wherein the method is practiced in a cloud-computing environment.

10. A computer program product for verifying information, the computer program product comprising a computer readable storage medium having program instructions embodied therewith, readable/executable by a computer, to cause the computer to perform a method comprising:
    measuring a first signal strength from a user device to a second device, from the perspective of the user device;
    measuring a second signal strength from the second device to the user device, from the perspective of the second device;
    measuring a third signal strength between a third device and the user device, where the third signal strength is measured from the perspective of the third device;
    comparing the first signal strength with the second signal strength and the first signal strength with the third signal strength; and
    verifying the information based on a result of the comparing.

11. The computer program product of claim 10, wherein the information is a location of the user device, wherein said verifying is based on a difference between the first signal strength and the second signal strength being less than a predetermined threshold value.

12. The computer program product of claim 10, wherein the first device is selected from a group consisting of a mobile phone, a laptop, and a PDA.

13. The computer program product of claim 10, wherein the second device is selected from a group consisting of a WiFi hotspot, an access point, a network router, and a Bluetooth enabled device.

14. The computer program product of claim 10, further comprising measuring a plurality of third signal strengths from a plurality of third devices to the user device,
wherein the comparing compares the first signal strength with at least some of the third signal strengths to verify a location of the user device.

15. The computer program product of claim 14, wherein the third devices are within a predetermined distance from the location of the user device.

16. The computer program product of claim 14, wherein the location of the user device is verified based on a difference between the first signal strength and at least one of the third signals strengths being less than a predetermined threshold value.

17. A location verification system, said system comprising:
a processor; and
a memory, the memory storing instructions to cause the processor to:
measure a first signal strength from a user device to a second device, where the first signal strength is measured from the perspective of the user device;
measure a second signal strength from the second device to the user device, where the second signal strength is measured from the perspective of the second device;
measuring a third signal strength between a third device and the user device, where the third signal strength is measured from the perspective of the third device;
comparing the first signal strength with the second signal strength and the first signal strength with the third signal strength; and
verifying the information, based on a result of said comparing.

18. The system of claim 17, wherein the system is practiced in a cloud-computing environment.

19. The system of claim 17, wherein the information is a location of the user device, wherein said verifying is based on a difference between the first signal strength and the second signal strength being less than a predetermined threshold value.

20. The system of claim 17, wherein the second device is selected from a group consisting of a WiFi hotspot, an access point, a network router, and a Bluetooth enabled device.

* * * * *